US007937092B2

(12) United States Patent
Shim (10) Patent No.: US 7,937,092 B2
(45) Date of Patent: May 3, 2011

(54) METHOD FOR PROVIDING A LOCATION INFORMATION SERVICE IN MOBILE COMMUNICATIONS SYSTEM

(75) Inventor: Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 798 days.

(21) Appl. No.: 11/376,141

(22) Filed: Mar. 16, 2006

(65) Prior Publication Data

US 2006/0246920 A1    Nov. 2, 2006

Related U.S. Application Data (60) Provisional application No. 60/693,171, filed on Jun. 22, 2005.

(30) Foreign Application Priority Data

Apr. 30, 2005    (KR) .................. 10-2005-0036514

(51) Int. Cl.
  *H04W 24/00*    (2009.01)
(52) U.S. Cl. .................. 455/456.1; 455/456.2
(58) Field of Classification Search ..... 455/456.1–456.6
  See application file for complete search history.

(56) References Cited

U.S. PATENT DOCUMENTS

| | | | |
|---|---|---|---|
| 6,311,069 B1 * | 10/2001 | Havinis et al. ............ 455/456.4 |
| 6,463,289 B1 | 10/2002 | Havinis et al. | |
| 2002/0194011 A1 * | 12/2002 | Boies et al. .................. 705/1 |
| 2003/0023726 A1 | 1/2003 | Rice et al. | |
| 2004/0127229 A1 * | 7/2004 | Ishii ................... 455/456.1 |
| 2005/0014485 A1 | 1/2005 | Kokkonen et al. | |
| 2005/0181808 A1 * | 8/2005 | Vaudreuil .............. 455/456.3 |
| 2005/0239480 A1 | 10/2005 | Kim et al. | |
| 2005/0250516 A1 | 11/2005 | Shim | |
| 2010/0173649 A1 | 7/2010 | Ishii | |

FOREIGN PATENT DOCUMENTS

| | | |
|---|---|---|
| CN | 1475924 A | 2/2004 |
| JP | 2005-510912 A | 4/2005 |
| KR | 10-2002-0058764 A | 7/2002 |
| KR | 10-20030052841 A | 6/2003 |
| WO | WO 02/093291 A2 | 11/2002 |
| WO | WO-2005/074169 A1 | 8/2005 |

OTHER PUBLICATIONS

3GPP TS23.271 version 6.10.0 Release 6, Dec. 2004.*
English translation of claims for KR 1020030052841 A having a publication date of Jun. 27, 2003.
English translation of claims for KR 1020020058764 A having a publication date of Jul. 12, 2002.

(Continued)

*Primary Examiner* — Lester Kincaid
*Assistant Examiner* — Steven Lim
(74) *Attorney, Agent, or Firm* — Birch, Stewart, Kolasch & Birch, LLP (57) ABSTRACT

In a method for providing a location information service based upon a user's location, when a user is currently located within a preferred location or preferred area set by the user to apply privacy with respect to a transmission of location information thereto, a procedure for requesting the user's authorization is performed before transmitting the user's location information, namely, a location server checks a location information request for the user located within the preferred location or preferred area according to a privacy profile within the corresponding location or area and performs a user notification and verification process according to the privacy profile, to thereafter determine whether to forward the location information according to the result of the verification.

14 Claims, 5 Drawing Sheets

OTHER PUBLICATIONS

"3rd Generation Partnership Project: Technical Specification Group Services and System Aspects, System Aspects, Technical Report Enhanced Support for User Privacy in location services (Release 5); 3GPP TR 23.871", ETSI Standards, Jul. 1, 2002, XP014021953.

* cited by examiner

[Fig 1] Related art

METHOD FOR PROVIDING A LOCATION INFORMATION SERVICE IN MOBILE COMMUNICATIONS SYSTEM

This Nonprovisional application claims priority under 35 U.S.C. §119(e) on U.S. Provisional Application No. 60/693,171 filed on Jun. 22, 2005 and also under 35 U.S.C. §119(a) on Patent Application No. 10-2005-0036514 filed in the Republic of Korea on Apr. 30, 2005, the entire contents of which are hereby incorporated by reference.

TECHNICAL FIELD

The present invention relates to a location information service based upon a location (position) of a user in a wireless mobile communications system, and more particularly, to a method for providing a location information service using user privacy checking based upon the user location.

THE RELATED ART AND SUMMARY OF INVENTION

In general, in order to provide a user with a location information service, a mobile communications network is provided with a unit that calculates a location of a terminal, thereby providing a location service for transmitting the location of the terminal to a particular entity periodically or upon the user request.

Such network structure related to the location service is usually different from internal networks such as 3GPP, 3GPP2 or Open Mobile Alliance (OMA), and there are several methods for calculating the location of the terminal such as a method of using a cell-ID technique that transmitting a cell ID of the location of the terminal, a method for calculating the location of the terminal using triangular survey after measuring a time taken by transmitting a signal from the terminal to each base station adjacent thereto, or a method using a Global Positioning System (GPS), and the like.

The location information service may also include a method for protecting privacy related to location information from a particular client.

Figure 1:
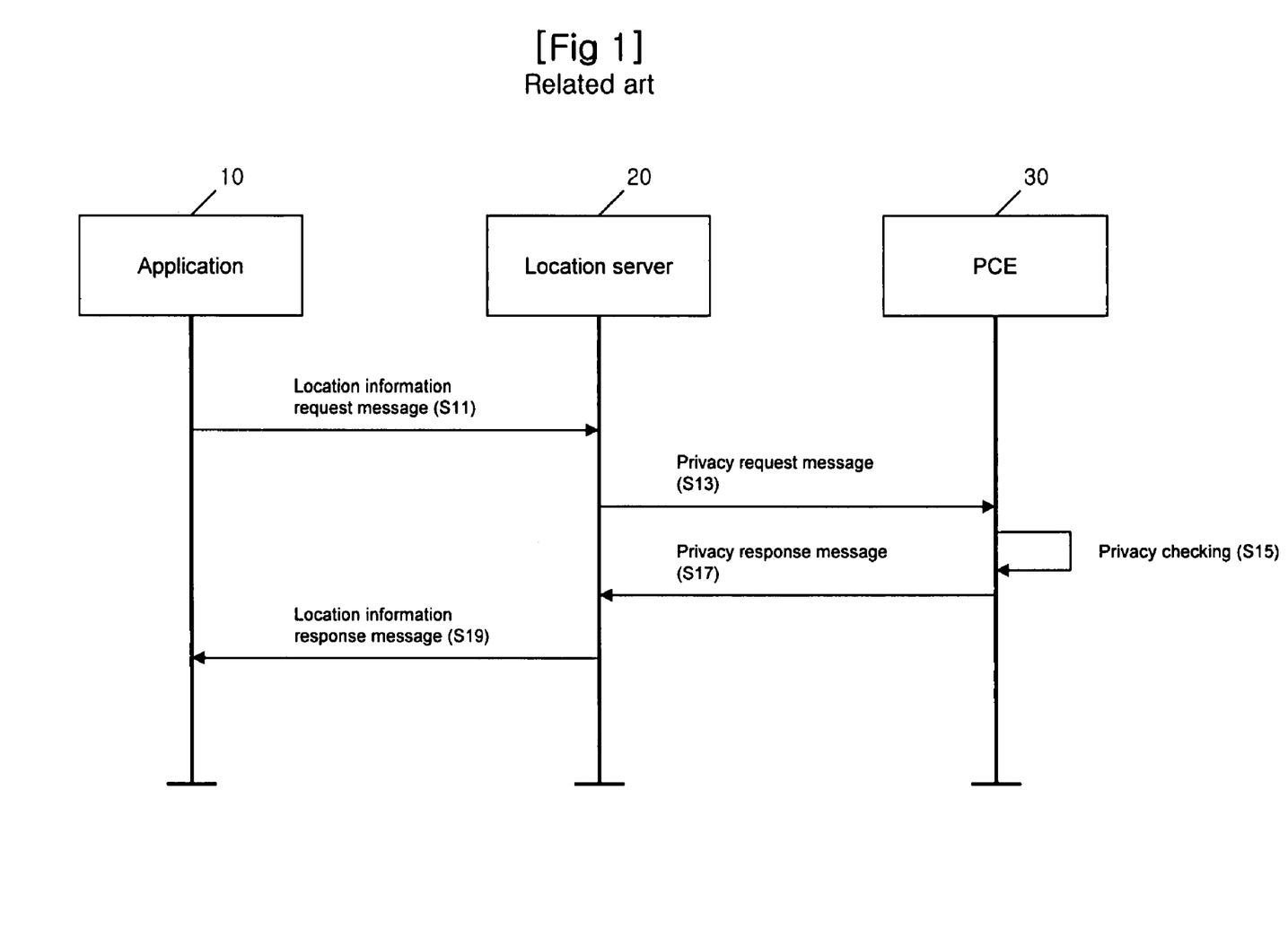
FIG. 1 is a signal flowchart showing a typical method for checking privacy.

FIG. 1 is a signal flow diagram illustrating a typical method for protecting privacy, in which a privacy checking protocol (PCP) is used.

A particular application 10 transmits a location information request message to a location server 20 in order to obtain location information for a particular user (S11). The location server 20 transmits a privacy request message to a Privacy Checking Entity (PCE) 30 in order to check the privacy related to the user's location information (S13).

The PCE 30 having received the privacy request message from the location server 20, checks privacy information associated with the user location information and checks information regarding an operation of the location server 20 (S15). Then, the PCE 30 transmits the operation information of the location server 20 associated with the privacy to the location server 20 using a privacy response message (S17), the location server 20 having received the privacy response message from the PCE 30 transmits the user location information to the application 10 in the form of a location information response message (S19).

Privacy profiles defined in the related art PPR may roughly be divided into five.

1) Positioning is not allowed.
2) Positioning is allowed without notifying the user.
3) Positioning is allowed with a notification to the user.
4) Positioning requires a notification and verification by the user; positioning is allowed only if it is granted by the user or if there is no response to the notification;
5) Positioning requires a notification and verification by the user; positioning is allowed only if it is granted by the user.

However, the related art location information system does not provide various privacy authentication (management) services based upon the user location and set conditions. In particular, there is no related art location information system that has a feature of privacy profile considering the user location information. In other words, the related art location information system has not provided any method for performing the user authorization and verification based upon the location of a target user.

One aspect of the present invention involves the recognition by the present inventors of the drawbacks in the related art, as explained above. Based upon such recognition, improvements in providing a location information service using user privacy checking based upon the user location can be achieved according to the present invention.

Certain features that may be part of the location information service method and system will not be described in much detail, merely to prevent the characteristics of the present invention from being obscured. However, such additional features may also be part of the location information service method and system of the present invention, as would be understood by those skilled in the art.

It is an object of the present invention to provide a method for providing a location information service based upon a user location in which a user sets privacy with respect to various locations or areas and the privacy is applied according to the current user location thereby having a different privacy in different locations.

It is another object of the present invention to provide a method for providing a location information service based upon a user location in which privacy can be more secured based upon a current user location by allowing the user to determine whether or not to report a location information within preferred areas set by the user by performing a post positioning notification and verification process.

To achieve these objects, there is provided a method for providing a location information service in a system for transmitting location information of a particular user requested by a Location Requesting Entity (LRE) (e.g., an external client, an SUPL agent in SUPL network) comprising: checking whether a user is currently located in a preferred location or a preferred area set by the user; checking privacy information with respect to the location information within the corresponding preferred location or preferred area when the user is currently located within the preferred location or the preferred area; and determining whether to report the user's location information to the LRE according to the privacy information.

According to a first embodiment of the present invention, a method for providing a location information service in a network system in which a user has set one or more preferred locations or preferred areas and respective privacy thereof, the method may comprise: performing positioning for a user by a location server (e.g., GMLC (Gateway Mobile Location Center) in 3GPP, SLP (SUPL) Location Platform) in SUPL network, etc.) which has received a location information request message for the user from the LRE; checking whether the user is currently located within the set preferred location or preferred area; checking privacy according to a location information within the corresponding preferred location or preferred area; requesting to perform a notification process for notifying a transmission of the location information to the user upon checking the privacy; and receiving a response with respect to the request and thus determining whether to report the user's location information according to the received response.

According to a second embodiment of the present invention, a method for providing a location information service, in a system in which an external client requests location information related to a user who has moved from a Home-Gateway Mobile Location Center (H-GMLC) to a Visited-GMLC (V-GMLC) based upon a 3GPP entity, may comprise: checking privacy with respect to the positioning for the user by the H-GMLC having received a location information request; checking by the H-GMLC address information of the V-GMLC; obtaining, by the V-GMLC, the location information through the user positioning procedure and transmitting the location information to the H-GMLC; checking privacy with respect to the location information based upon the user current location information by the H-GMLC; if the user is required to check for the location information, transmitting a notification request message from the H-GMLC to the V-GMLC; performing a procedure for notifying the location information between the V-GMLC and the user; receiving a verification response message including the result of the notification and transmitting the received verification response message to the H-GMLC by the V-GMLC; and reporting the user location information to the client according to the result by the H-GMLC having received the verification message.

According to a third embodiment of the present invention, a method for providing a location information service, in a method for providing location information related to a user within a circuit service domain in which privacy has been set with respect to location information in a 3GPP entity, may comprise: performing positioning for a user and calculating location information accordingly by a GMLC which receives a location information request from a particular client in the 3GPP network; transmitting, by the GMLC, a notification message for requesting the user notification and verification for whether to transmit the location information; transmitting a location information notification message to the user by a Visited-MSC/Mobile services Switching Center (MSC/MSC) server having received the notification message; when the user verification is requested, receiving a verification message including the result of the verification from the corresponding server by the VMSC/MSC server; receiving, by the GMLC, a notification response message including the result of the notification and verification from the VMSC/MSC server; and reporting the users location information to the client from the GMLC.

According to a fourth embodiment of the present invention, a method for providing a location information service, in a method for providing a service related to location information related to a user within a packet service domain in which privacy has been set with respect to location information in a 3GPP entity, may comprise: performing positioning for a user and calculating the location information accordingly by a GMLC having received a location information request from a particular client in the 3GPP network; transmitting, by the GMLC, a notification message for requesting the user notification and verification with respect to whether to transmit the location information; performing a security procedure with the user by a Serving GPRS Supported Node (SGSN) having received the notification message; transmitting a location information notification message to the user from the SGSN; when the user notification is requested, receiving a verification message including the result of the verification from the corresponding user by the SGSN; receiving, by the GMLC, a notification response message including the result of the notification and verification from the SGSN; and reporting the user location information to the client from the GMLC.

MODES FOR CARRYING OUT THE
PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The present invention defines more privacy profiles based upon user location information and thus having a procedure of requesting a user authorization before reporting location information within a preferred location or preferred area set by the corresponding user.

In general, in a user location information service to which the privacy profiles are added, a network service provider should always obtain location information, and the user can always change the privacy profile by setting such Privacy Profile Register (PPR), Privacy Exception List (PEL), Privacy Checking Entity (PCE), and the like. Also, the default condition shall normally be to deny the positioning attempt. The default treatment, which is applicable in the absence of a response from the target user or user equipment (UE), shall be specified in the target UE Subscription Profile. Thus, for some location services the default treatment may be to accept the positioning request, whereas for other location services the default treatment may be to reject the positioning attempt.

The home network shall have the capability of defining the default circumstances in which the target UE's location information is allowed to be provided as required by various administrations and/or network requirements.

The privacy check shall be performed in the Home Environment of the target UE subscriber. This makes it possible for operators to ensure the privacy of their own subscribers, i.e. the privacy settings that are used for privacy checks are always up-to-date and as specified by the Home Environment of the target UE subscriber.

It shall be possible for the privacy check to take into account Home Environment specific information such as time of day, subscriber location, and the like. It shall be possible to ensure that privacy checks are performed according to the latest information as available in the Home Environment.

Also, the target UE Subscriber shall be able to restrict access to the Location Information (permanently or on a per-attempt-basis). The LCS Client access shall be restricted unless otherwise stated in the Target UE Subscription Profile. Again, in the absence of specific permission to position the target UE, the target UE should not be positioned.

Usually, specific local, national, and regional privacy regulations must be complied with a location information service which privacy profiles are added, and multiple layers of permissions may be required for the location information service. For example, specific privacy exceptions may exist for compliance with mandated location based service (such as for emergency services or lawful intercept) which are required by national or local regulatory requirements.

Sometimes, the operator shall be able to determine the location of the target UE (e.g. for lawful interception or emergency call). For emergency services (where required by local regulatory requirements), target UE making an emergency call may be positioned regardless of the privacy profile value of the subscriber associated with the target UE (or ME) making the call.

Preferably, the target UE user shall not be notified of any location attempt. Unless required by local regulatory requirements, or overridden by the target UE User, the target UE may be positioned only if allowed in the UE subscription profile.

Also, for Public-Land-Mobile-Network (PLMN) operator services, the target UE subscriber may be able to restrict access to location information used to enhance or support particular types of service. The LCS client access shall be restricted unless stated otherwise in the target UE subscription profile. The target UE user shall not be notified of any authorized location attempt. And, for Lawful Interception Services (where required by local regulatory requirements), target UE may be positioned under all circumstances required by local regulatory requirements.

Therefore, all location requests (LRs) shall be done with a privacy check except for the following: 1) LRs relating to lawful interception; 2) LRs related to emergency calls; 3) LRs from the serving network related to anonymous tracking for statistical and O&M purposes; and 4) LRs from the home network as requested by the home network operator for its own internal purposes.

The home network operator should not use the UE location information, which was obtained from the visited network without privacy checks, for value added services or to forward such location information to any third party.

Here, as one example of the present invention, in addition to the five privacy profiles defined in the related art PPR based upon the 3GPP having mentioned above, eight more profiles (6~13) may be added to perform the user notification and verification according to the current user location. Here, the added eight profiles may be used in case of setting a different privacy respectively according to the user current location.

The thirteen privacy profiles defined in the PPR based upon the 3GPP as an example of the present invention will be described as follows.

1) Positioning is not allowed.
2) Positioning is allowed without notifying the user.
3) Positioning is allowed with a notification to the user.
4) Positioning requires a notification and verification by the user; positioning is allowed only if it is granted by the user or if there is no response to the notification;
5) Positioning requires a notification and verification by the user; positioning is allowed only if it is granted by the user.
6) Reporting of location information requires a notification and verification by the user based on current location; positioning is performed without notifying the user and the reporting of the location information is performed when it is granted by the user or any response with respect to the notification is not received.
7) Reporting of location information requires a notification and verification by the user based on current location; positioning is performed without notifying the user and the reporting of the location information is performed only if it is granted by the user.
8) Reporting of location information requires a notification and verification by the user based on current location; positioning is performed after notifying the user and the reporting of the location information is performed when it is granted by the user or any response with respect to the notification is not received.
9) Reporting of location information requires a notification and verification by the user based on current location; positioning is performed after notifying the user and the reporting of the location information is performed only if it is granted by the user.
10) Reporting of location information requires a notification and verification by the user based on current location; positioning is performed after carrying out the notification and verification process by the user. The positioning is even performed in case that it is authorized by the user or any response with respect to the notification is not received. Also, the reporting of the location information is performed only if it is granted by the user.
11) Reporting of location information requires a notification and verification by the user based on current location; positioning is performed after carrying out the notification and verification process by the user. The positioning is even performed in case that it is authorized by the user or any response with respect to the notification is not received. Also, the reporting of the location information, like the positioning, is performed even when it is granted by the user or any response with respect to the notification is not received.
12) Reporting of location information requires a notification and verification by the user based on current location; positioning is performed after carrying out the notification and verification process by the user only when it is granted by the user. Also, the reporting of the location information is performed even when it is granted by the user or any response with respect to the notification is not received.
13) Reporting of location information requires a notification and verification by the user based on current location; positioning is performed after carrying out the notification and verification process by the user only when it is granted by the user. Also, the reporting of the location information is performed even when it is granted by the user.

Here, the privacy profiles of the present invention correspond to 6) to 13). In order to request a user authorization before reporting location information within the preferred location or preferred area preset by the user, an additional process is needed to be provided for requesting the user authorization based upon a location value calculated after performing the positioning for the corresponding user. A brief explanation will now be given for the method for providing the location information service according to the present invention.

First, a particular user uses one of the privacy profile values associated with its location information to set whether to transmit its location information from one or more locations or areas to a third user or other network entity. Here, the location or area in which the user has set the privacy profile associated with its location information is set as one user preferred area. That is, while moving, the user can set one or more user preferred areas and a privacy profile for each preferred area.

The privacy profiles within the preferred areas having set by the user, namely, information with respect to whether to transmit the user's location information and whether to request the performing of the process for the user authorization can be stored in the PPR or a separate storage unit.

When the third user or the network entity requests the user's location information, the specific user connects to the PPR to check the privacy profile associated with the location information set by the user.

If the privacy profile relates to requesting a notification and verification based upon the current user position, the specific user checks information of whether to transmit the user's location information and whether to request the performing of a process for the user authorization. The specific user then determines whether to transmit the corresponding user's location information. Subsequent procedures for the location information request from the third user or another network entity can be then performed.

Figure 2:
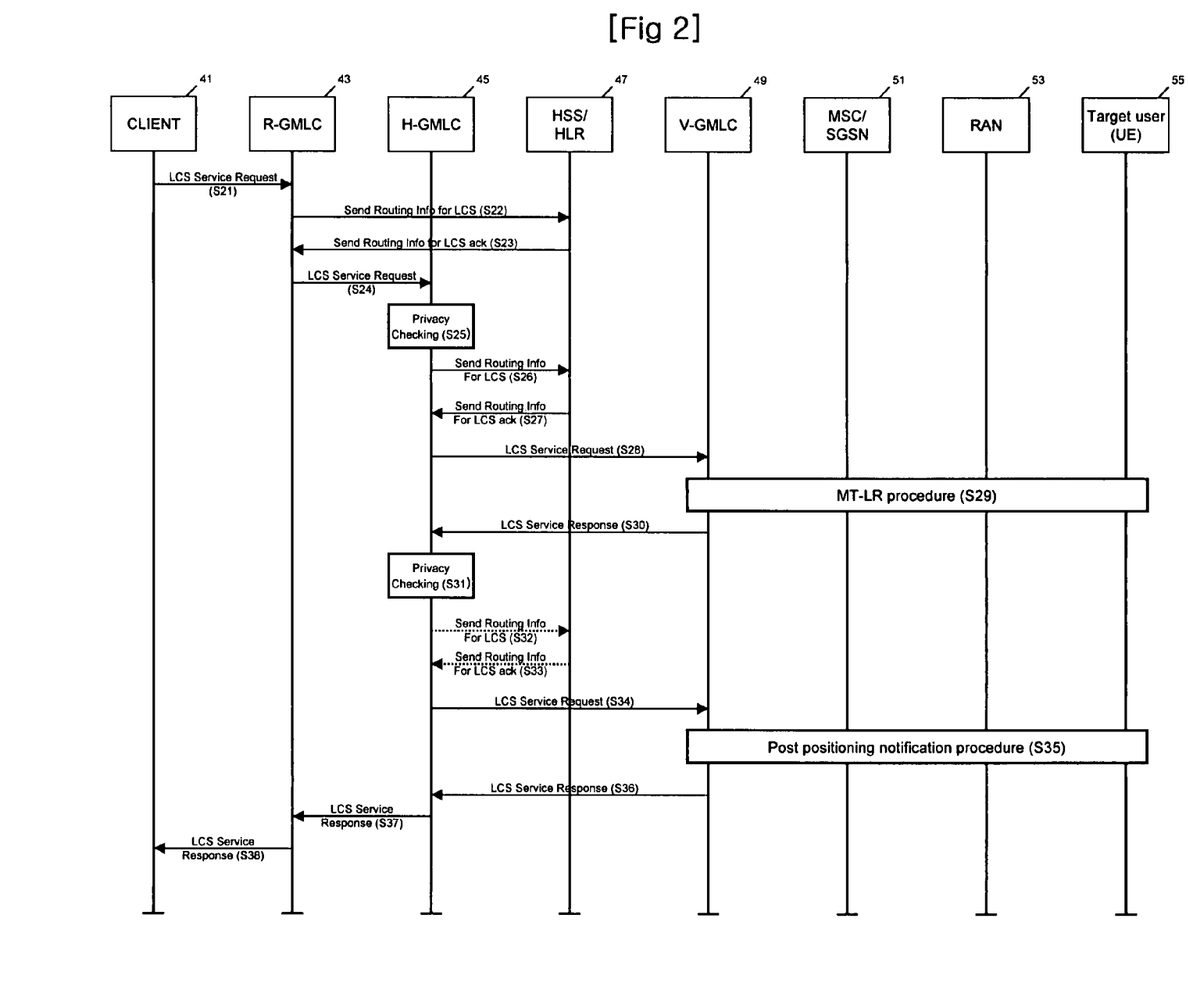
FIG. 2 is a signal flowchart showing an embodiment of a method for providing a location information service in accordance with the present invention.

FIG. 2 is a signal flowchart showing an embodiment of a method for providing a location information service according to the present invention, which describe a Mobile Terminating Location Request (MT-LR) procedure in a packet service (PS) domain and a circuit service (CS) domain.

A network for implementing a location information service may comprise a Live Communications Server (LCS) client 41, GMLCs 43, 45 and 49, a Home Location Register (HLR)/Home subscriber Server (HSS) 47, a Mobile services Switching Center (MSC)/Serving GPRS Supported Node (SGSN) 51, and Radio Access Network (RAN) 53, and a target user (e.g., target UE) of which location information is requested.

The GMLC may include a Requesting-GMLC (referred to as R-GMLC, hereafter) 43 of a network which requests the location information, a Home-GMLC (referred to as H-GMLC, hereafter) 45 which is a GMLC of a user's home network, and a Visited-GMLC (referred to as V-GMLC) 49 which is a GMLC to which the user has moved when the user has moved to the third network.

In the present invention, it is assumed that a target user 55 from which the LCS client 41 requests the location information moves to the third network. The target user 55 can be referred to as just a user hereafter.

An external location service client Oust referred to as a LCS client hereafter) 41 transmits a LOCATION INFORMATION REQUEST message (e.g., LCS Service Request) to the R-GMLC 43 to request location information related to a particular target user 55 (S21).

The R-GMLC 43 having received the LOCATION INFORMATION REQUEST message checks an ID of the LCS client 41 and verifies whether it is an available client. The R-GMLC 43 then checks whether the user privacy profile is stored therein. Here, if the privacy profile is stored in the R-GMLC 43, the R-GMLC 43 is the H-GMLC 45 of the user 55 and thus it is possible to skip a series of processes (S22 and S23) for obtaining the address of the H-GMLC 45 and processes (S24 and S37) for exchanging messages between the R-GMLC 43 and the H-GMLC 45. If the R-GMLC 43 already knows the address of the H-GMLC 45, such processes (S22 and S23) for obtaining the address of the H-GMLC 45 can be skipped.

If the R-GMLC 43 is not the H-GMLC 45 and does not know the address of the H-GMLC 45, the R-GMLC 43 transmits a ROUTING INFORMATION REQUEST message (e.g., Send Routing Info For LCS) to the HLR/HSS 47 of the user's home network to request the address of the H-GMLC 45 (S22). The HLR/HSS 47 checks whether the R-GMLC 43 is authorized to request the location information related to the user 55. Thereafter, the HLR/HSS 47 transmits the address of the H-GMLC 45 to the R-GMLC 43 using a ROUTING INFORMATION REQUEST RESULT message (e.g., Send Routing Info For LCS ack) (S23).

The R-GMLC 43 having received the ROUTING INFORMATION REQUEST RESULT message transmits a LOCATION INFORMATION REQUEST message (e.g., LCS Service Request) related to the user 55 to the H-GMLC 45 (S24), which then accesses the PPR (not shown in Figure) to check privacy settings associated to the location information for the user 55 (S25). Here, while checking the privacy settings, the H-GMLC 45 checks possibility of positioning.

If it is possible to perform the positioning for the user 55, the H-GMLC 45 transmits the ROUTING INFORMATION REQUEST message (e.g., Send Routing Info For LCS) to the HLR/HSS 47 in order to check addresses of the V-GMLC 49 and the SGSN and/or VMSC/MSC 51 (S26), and receives the addresses of the SGSN and/or VMSC/MSC 51 and the V-GMLC 49 from the HLR/HSS 47 related to the user 55 using a ROUTING INFORMATION REQUEST RESULT message (e.g., Send Routing Info For LCS ack) (S27).

The H-GMLC 45 transmits the LOCATION INFORMATION REQUEST message (e.g., the LCS Service Request) to the corresponding V-GMLC 49 by checking the address thereof included in the ROUTING INFORMATION REQUEST RESULT message (S28). The V-GMLC 49 having received the LOCATION INFORMATION REQUEST message performs an MT-LR procedure with the user 55 for the positioning with respect to the user 55 (S29). The MT-LR procedure will be explained in detail later.

The V-GMLC 49 transmits location information related to the user 55 which has been calculated by performing the MT-LR procedure to the H-GMLC 45 using a LOCATION INFORMATION RESPONSE message (e.g., LCS Service Response) (S30). The H-GMLC 45 having received the LOCATION INFORMATION RESPONSE message checks the privacy settings of the current user 55 in order to determine whether the location information related to the corresponding user 55 corresponds to the preferred area set in the privacy (S31).

During the processes (S25 and S31) for checking the privacy setting, if the privacy profile is checked to have been added in the present invention, namely, if the privacy profile is to request the notification and verification based upon the current user position, the H-GMLC 45 performs a series of processes (S32 through S36) to verify whether to report the location information related to the user 55 to the LCS client 51.

If the privacy profile for the user 55 is to request the notification and verification within a particular location or area and the current user location or area is the preferred area for which the notification and verification should be performed, the H-GMLC 45 transmits the ROUTING INFORMATION REQUEST message (e.g., Send Routing Info For LCS) to the HLR/HSS 47 to request the addresses of the V-GMLC 49 and the SGSN and/or VMSC/MSC 51 (S32), and receives the information of the addresses thereof from the HLR/HSS 47 through the ROUTING INFORMATION REQUEST RESULT message (e.g., Send Routing Info For LCS ack) (S33). Here, the processes (S32 and S33) for checking the addresses of the SGSN and/or VMSC/MSC 51 and the V-GMLC 49 are optionally performed in case that the H-GMLC 45 already knows the address information.

The H-GMLC 45 transmits a NOTIFICATION REQUEST message for requesting the user notification and verification to the V-GMLC 49 of a network to which the user 55 has moved (S34). The V-GMLC 49 having received the NOTIFICATION REQUEST message performs a notification process with the corresponding user 55 to check whether to report the location information (S35). Here, the notification process according to the present invention will be explained in detail with reference to the related drawings.

The V-GMLC 49 checks whether to report the location information related to the user 55 to the LCS client 41 through the notification process, and transmits the result of the check to the H-GMLC 45 by including the result in a NOTIFICATION RESPONSE message (S36). Here, the result included in the responded message may be represented with an indication of attribute, parameter, element, value, and the like. When the V-GMLC 49 does not receive the result of the verification from the user 55 during the notification procedure, the V-GMLC 49 counts down a particular time duration using an internal timer, and thereafter transmits the NOTIFICATION RESPONSE message including the result of the unsuccessful reception of the notification result to the H-GMLC 45.

The H-GMLC 45 transmits a LOCATION INFORMATION RESPONSE message including the location information related to the user 55 to the R-GMLC 43 according to the resultant value included in the NOTIFICATION RESPONSE message or consistency with the conditions for the transmission of the location information (S37). The R-GMLC 43 transmits the LOCATION INFORMATION RESPONSE message to the LCS client 41 (38). Here, if the NOTIFICATION RESPONSE message includes a value or indication of not-granted state for the reporting of the user location information or the preset conditions for the transmission of the location information are not complied with, the H-GMLC 45 notifies the LCS client 41 with showing a reporting of the location information is not granted.

Figure 3:
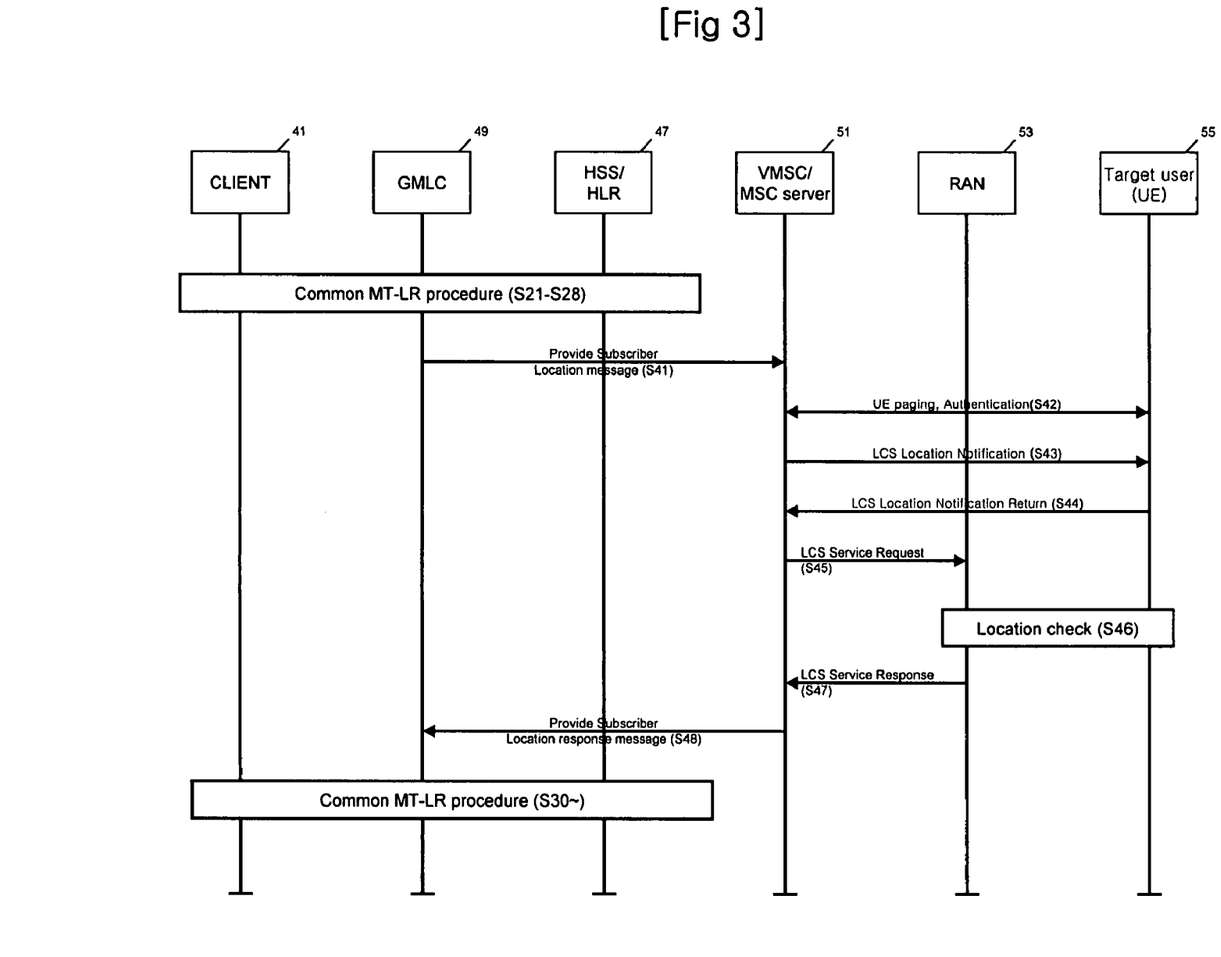
FIGS. 3 and 4 are signal flowcharts respectively showing a detailed MT-LR procedure of the FIG. 2.
Figure 4:
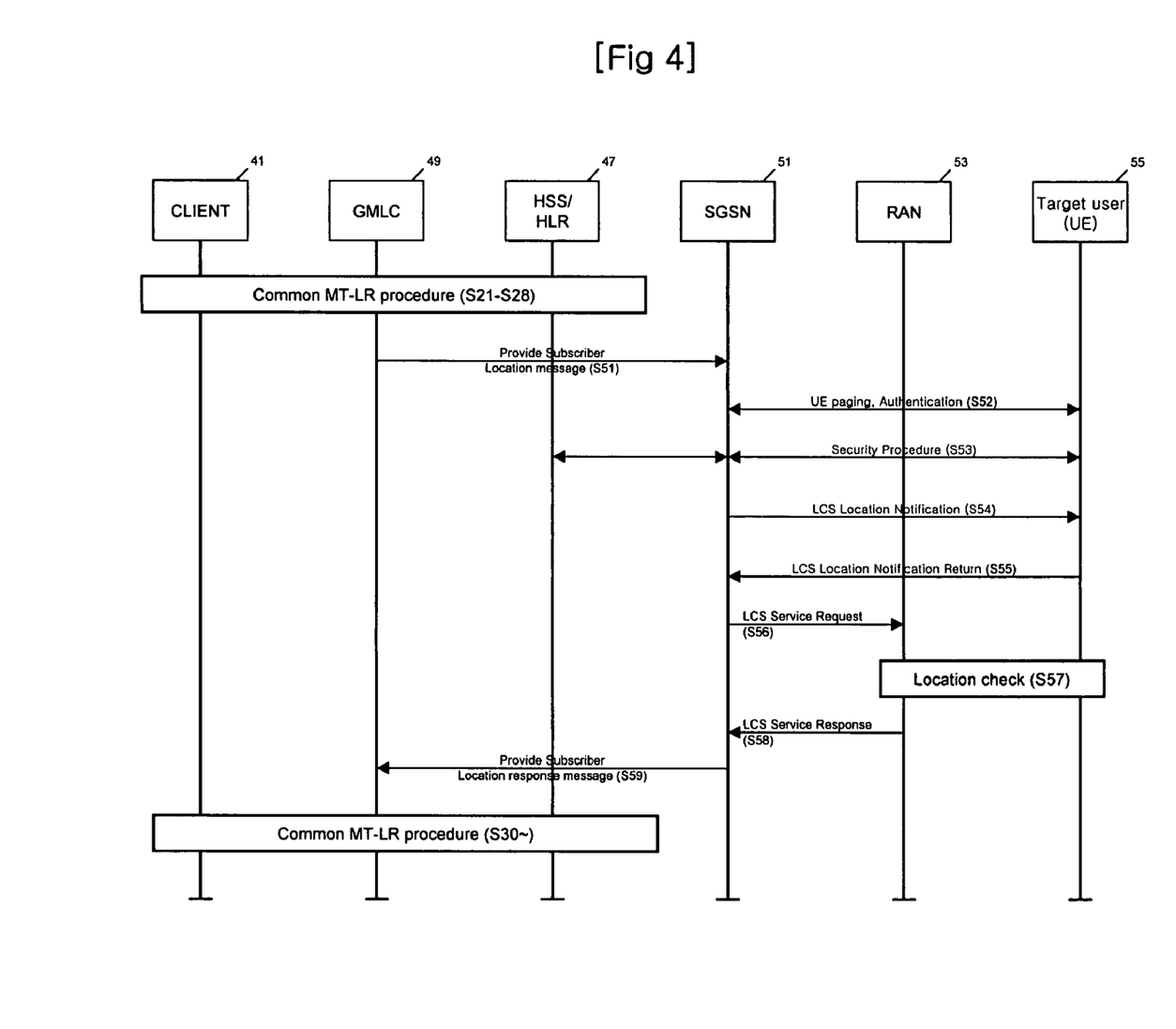

FIGS. 3 and 4 are signal flowcharts respectively showing a detailed MT-LR procedure S29 shown in FIG. 2, which describes the MT-LR procedure which is implemented differently according to whether a current user service network is a circuit service (CS) domain or a packet service (PS) domain after performing such processes corresponding to S21 through S28 shown in FIG. 2.

FIG. 3 is a signal flowchart showing a MT-LR procedure in the CS domain. After performing the common processes corresponding to S21 through S28 of FIG. 2, the GMLC 49 transmits a PROVIDE SUBSCRIBER LOCATION message to the VMSC/MSC server 51 (S41). Here, the message may include types of the requested location information (e.g., a current location, speed information or the like), a user's IMSI (International Mobile Subscriber Identity), LCS QoS (Location Service Quality of Service) information (e.g., accuracy, responding time, etc.) and the like.

The VMSC/MSC server 51 calls the user 55 via a RAN 53 to perform an authentication process therewith (S42). If a notification and authentication with respect to the corresponding user 55 is required in connection with the location information for the user 55, the VMSC/MSC server 51 transmits a LOCATION INFORMATION NOTIFICATION message (e.g., LCS Location Notification) to the user 55 (S43). Here, whether the notification and verification is required can be checked by considering the privacy profiles in the privacy checking process of S31 in FIG. 2.

If the user verification with respect to the LOCATION INFORMATION NOTIFICATION message is required, the corresponding user 55 transmits a VERIFICATION RESPONSE message (e.g., LCS Location Notification Return) to the VMSC/MSC server 51 (S44). The VMSC/MSC server 51 then transmits a LOCATION INFORMATION REQUEST message to the RAN 53 (S45).

An actual positioning is performed between the RAN 53 and the user 55 (S46). The RAN 53 transmits the calculated location information to the VMSC/MSC server 51 using a LOCATION INFORMATION RESPONSE message (S47). The VMSC/MSC server 51 transmits the calculated location information to the GMLC 49 using a PROVIDE SUBSCRIBER LOCATION RESPONSE message (S48).

In this way, the common MT-LR procedure corresponding to S30, S37 and S38 in FIG. 2 is then performed.

FIG. 4 is a signal flowchart showing a MT-LR procedure in the PS domain. After performing the common processes corresponding to S21 through S28 in FIG. 2, the GMLC 49 transmits the PROVIDE SUBSCRIBER LOCATION message to the SGSN 51 (S51). Here, the message may include types of the requested location information (e.g., a current location, speed information or the like), a user's IMSI (International Mobile Subscriber Identity), LCS QoS (Location Service Quality of Service) information (e.g., accuracy, responding time, etc) and the like.

The SGSN 51 calls the user 55 via the RAN 53 to perform an authentication process therewith (S52), and performs a security procedure therewith (S53).

If a notification and verification with respect to the corresponding user 55 is required in connection with the user's location information, the SGSN 51 transmits the LOCATION INFORMATION NOTIFICATION message (e.g., LCS Location Notification) to the corresponding user 55 (S54), and receives, if necessary, the VERIFICATION RESPONSE message (e.g., LCS Location Notification Return) in response to the LOCATION INFORMATION NOTIFICATION message from the user 55 (S55). Here, whether the notification and verification is required can be checked based upon the privacy profiles in the privacy checking process of S31 in FIG. 2.

The SGSN 51 transmits the LOCATION INFORMATION REQUEST message to the RAN 53 (S56). Positioning is thus performed by exchanging messages between the RAN 53 and the user 55 (S57). The RAN 53 transmits the calculated location information to the SGSN 51 using the LOCATION INFORMATION RESPONSE message (S58). The SGSN 51 transmits the calculated location information to the GMLC 49 using a PROVIDE SUBSCRIBER LOCATION RESPONSE message (S59).

Thereafter, the common MT-LR procedure corresponding to S30, S37 and S38 in FIG. 2 is then performed.

The GMLC of FIGS. 3 and 4 indicates the V-GMLC 49 of FIG. 2, which is the GMLC of the network to which the user 55 of which location information has been requested by the LCS client 41 currently belongs.

Figure 5:
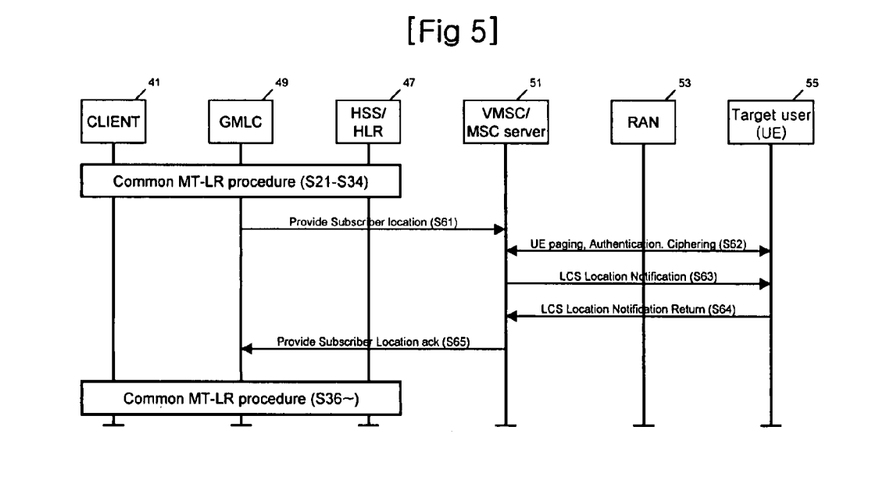
FIGS. 5 and 6 are signal flowcharts respectively showing a detailed notification procedure of FIG. 2.
Figure 6:
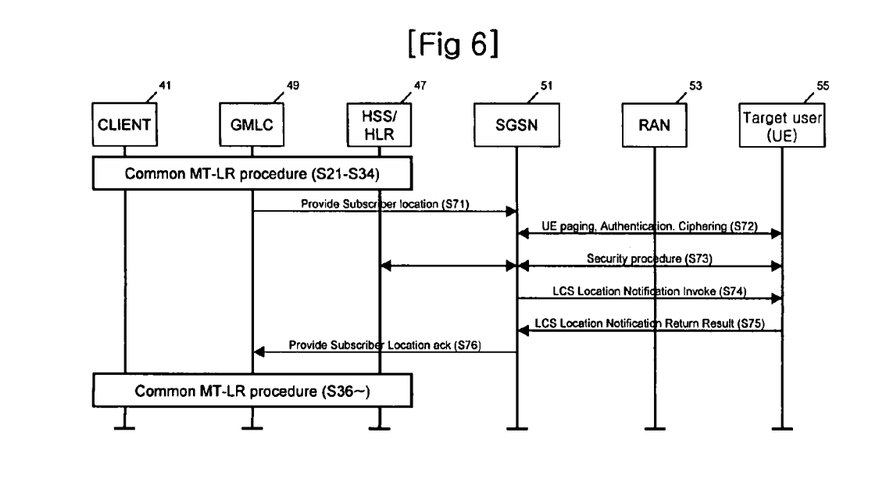

FIGS. 5 and 6 are signal respectively flowcharts showing the notification procedure S35 of FIG. 2 (i.e., the post positioning notification procedure for CS and PS domains) in detail. After performing the MT-LR procedure corresponding to S21 through S34 in FIG. 2, the notification procedure which may be implemented differently according to whether the current service network to which the user currently belongs is the CS domain or the PS domain will now be described.

In the present invention, when the user's location information is transmitted to a third user or to another network entity within a specific preferred area, the user can set privacy such that the user can perform the notification and verification process for reporting of location information.

When the user is currently located within a preferred area and the privacy profile set for the area requires the notification and verification process, the notification process is performed to check whether to transmit the user's location information.

FIG. 5 is a signal flowchart showing the notification procedure in the CS domain. After performing the MT-LR procedure (i.e., the MT-LR procedures for CS and PS domains)

corresponding to S21 through S34 in FIG. 2, the GMLC 49 transmits a NOTIFICATION REQUEST MESSAGE (e.g., Provide Subscriber Location) to the VMSC/MSC server 51 (S61). Here, the GMLC 49 transfers a notification and verification request of the transmission of location information to the VMSC/MSC server 51 using the NOTIFICATION REQUEST message.

The VMSC/MSC server 51 performs an authentication process by calling the user 55 via the RAN 53 (S62), and then transmits to the user 55 a LOCATION INFORMATION NOTIFICATION message (e.g., LCS Location Notification) for notifying the user 55 of the notification and verification request related to the current user location information (S63).

If the user verification with respect to the LOCATION INFORMATION NOTIFICATION message is required, the corresponding user 55 transmits to the VMSC/MSC server 51 a VERIFICATION RESPONSE message (e.g., LCS Location Notification Return) (S64). The VMSC/MSC server 51 transmits the result of the notification and verification related to the location information to the GMLC 49 using the NOTIFICATION RESPONSE message (S65) (e.g., Provide Subscriber Location ack). Here, the result included in the responded message may be represented with an indication of attribute, parameter, element, value, and the like.

Thereafter, the location information related to the user 55 may be transmitted or not to the LCS client 41 depending on the NOTIFICATION RESPONSE message.

FIG. 6 is a signal flowchart showing the notification procedure within the PS domain. After performing the MT-LR procedure corresponding to S21 through S34 in FIG. 2, the GMLC 49 transmits the NOTIFICATION REQUEST message (e.g., Provide Subscriber Location) to the SGSN 51 (S71). Here, the GMLC 49 transfers a notification and verification request with respect to the transmission of location information to the SGSN 51.

The SGSN 51 performs an authentication process by calling the user 55 via the RAN 53 (S72), and then performs a security process with the corresponding user 55 (S73). The SGSN 51 then transmits to the user 55 the LOCATION INFORMATION NOTIFICATION message (e.g., LCS Location Notification Invoke) for notifying the user 55 of the notification and verification request related to the current user location information (S74).

If the user verification with respect to the LOCATION INFORMATION NOTIFICATION message is required, the corresponding user 55 transmits to the SGSN 51 the VERIFICATION RESPONSE message (e.g., LCS Location Notification Return Result) (S75). The SGSN 51 transmits the result of the notification and verification related to the location information to the GMLC 49 using the NOTIFICATION RESPONSE message (e.g., Provide Subscriber Location ack) (S76). Here, the result included in the responded message may be represented with an indication of attribute, parameter, element, value, and the like.

Thereafter, the location information related to the user 55 may be transmitted or not to the LCS client 41 depending on the NOTIFICATION RESPONSE message.

The GMLC of FIGS. 5 and 6 indicates the V-GMLC 49 of FIG. 2, which is the GMLC of the network to which the user 55 of which location information has been requested by the LCS client 41 currently belongs.

The present invention can be characterized by comprising checking whether the user is currently located within the preferred location or preferred area set by the user, checking privacy with the transmission of the location information if the user is currently located within the preferred location or preferred area, requesting the user to perform a process for notifying the transmission of the location information according the checked privacy, and receiving a message in response to the request to determine accordingly whether to transmit the user's location information.

In addition, the present invention can also be characterized, in a system for transmitting location information with respect to a specific user using a network structure constituted with the SUPL agent, the SLP and the SET of the SUPL network, by comprising checking whether the user is currently located within the preferred location or preferred area set by the user, checking privacy information with respect to the transmission of the location information within the preferred location or preferred area if the user is currently located therein, and determining whether to transmit the user's location information to the LRE depending on the privacy information.

Also, the various features of the present invention may be further described and explained in the following manner. Note that the element reference numbers have not been specified, but may be clearly understood upon viewing the drawings and this overall disclosure.

For example, it shall be possible for location services to support conditional reporting if the target UE is within specified geographical areas. Under these conditions, an application that is granted conditional positioning authorization must notify and obtain positioning authorization from the user of the target UE after the positioning process is performed, but before reporting the location of the target UE to the LCS client. It may also be possible for a target UE to authorize positioning attempts after the target UE is notified of a positioning request and the target UE grants permission for positioning. To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

The foregoing embodiments and advantages, which explained with figures, are merely exemplary and are not to be construed as limiting the present invention in one skilled in the ordinary art. Specifically, the features of the present invention may also be adapted and implemented in communication systems operating under other types of communication specifications (e.g., 3GPP, 3GPP2, 4G, IEEE, OMA (i.e., SUPL network), etc.) because the concepts and teachings of the present invention could be applied to various communication schemes that operate in a similar manner based upon common techniques.

The description of the present invention is intended to be illustrative, and not to limit the scope of the claims. Many alternatives, modifications, and variations will be apparent to those skilled in the art.

The invention claimed is:

1. A method of providing location information of a target terminal in a network system including a Home GMLC (Gateway Mobile Location Center) and a Visited GMLC (Gateway Mobile Location Center), the method comprising:
  receiving, by the Home GMLC, a first LCS (LoCation Services) service request message for the location information of the target terminal from a LCS client;
  performing, by the Home GMLC, a first privacy check for a positioning of the target terminal;
  sending, by the Home GMLC, a second LCS service request message to the Visited GMLC;

receiving, by the Home GMLC, a first LCS service response message including a current location information of the target terminal;

performing, by the Home GMLC, a second privacy check in order to decide whether the Home GMLC can forward the current location information of the target terminal to the LCS client or send a third LCS service request message if the result of the second privacy check requires a notification and a verification depending on the current location information of the target terminal, wherein the second privacy check is performed after receiving the first LCS service response message including the current location information of the target terminal;

after performing the second privacy check, sending, by the Home GMLC, the third LCS service request message if the result of the second privacy check is to request the notification and verification depending on the current location information of the target terminal;

after performing the second privacy check, receiving, by the Home GMLC, a second LCS service response message in response to the third LCS service request message, wherein the second LCS service response message is received with an indication of the result of the notification and verification depending on the current location information of the target terminal by the target terminal; and sending, by the Home GMLC, a third LCS service response message including the current location information of the target terminal if the indication of the result indicates that a report of the current location information of the target terminal is allowed.

2. The method of claim 1, wherein the first LCS service request message is received via a Request GMLC.

3. The method of claim 2, wherein the Request GMLC sends a routing information request to a Home Location Register (HLR)/Home Subscriber Server (HSS) to request an address of a Home GMLC and receives a result of the routing information request indicating whether the LCS client is authorized to request the location information of the target terminal.

4. The method of claim 1, wherein the first LCS service request message is authorized according to the first privacy check on the basis of a target terminal's privacy profile stored in the Home GMLC or a Privacy Profile Register (PPR).

5. The method of claim 1, further comprising:
sending, by the Home GMLC, a routing information request message to a Home Location Register (HLR)/Home Subscriber Service (HSS) of the target terminal.

6. The method of claim 5, further comprising:
receiving, by the Home GMLC, a routing information response message in response to the routing information request message.

7. The method of claim 6, wherein the routing information response message includes at least one of addresses of a Serving GPRS Supported Node (SGSN) and a Mobile Switching Center (MSC)/Visited Mobile Switching Center (VMSC).

8. The method of claim 1, wherein the current location information of the target terminal is calculated by performing a positioning between a Radio Access Network (RAN) and the target terminal.

9. The method of claim 1, wherein the indication of the result is to indicate whether a report of the current location information is allowed or not allowed by the target terminal.

10. The method of claim 1, further comprising:
receiving, by a Visited Mobile Switching Center (VMSC), a subscriber location message from a Visited GMLC.

11. The method of claim 10, further comprising:
performing, by the VMSC, an authentication process with the target terminal.

12. The method of claim 11, further comprising:
sending, by the VMSC, a location notification message to the target terminal in order to notify the target terminal that the user verification is required.

13. The method of claim 1, further comprising:
receiving, by a Serving GPRS Supported Node (SGSN), a subscriber location message from a Visited GMLC.

14. The method of claim 13, further comprising:
sending, by the SGSN, a location notification message to the target terminal in order to notify the target terminal that the user verification is required.

* * * * *